United States Patent [19]

Hehl

[11] Patent Number: 5,388,983
[45] Date of Patent: Feb. 14, 1995

[54] INJECTION MOLDING MACHINE FOR PROCESSING SYNTHETIC MATERIALS

[76] Inventor: Karl Hehl, Arthur-Hehl-Str. 32, D-72290 Lossburg, Germany

[21] Appl. No.: 107,068

[22] Filed: Aug. 17, 1993

[30] Foreign Application Priority Data

Aug. 18, 1992 [DE] Germany ............................ 4227335

[51] Int. Cl.$^6$ ............................................. B29C 45/56
[52] U.S. Cl. ................................... 425/575; 264/328.11
[58] Field of Search ............................... 425/574, 575; 264/328.11

[56] References Cited

U.S. PATENT DOCUMENTS

| 5,007,816 | 4/1991 | Hehl | 425/135 |
| 5,223,281 | 6/1993 | Hehl | 425/575 |

FOREIGN PATENT DOCUMENTS

| 0291008 | 11/1988 | European Pat. Off. . |
| 0368149 | 5/1990 | European Pat. Off. . |
| 0483492 | 5/1992 | European Pat. Off. . |
| 4034577 | 1/1992 | Germany . |
| 4142927 | 7/1993 | Germany . |
| 381420 | 10/1964 | Switzerland . |

*Primary Examiner*—Tim Heitbrink
*Attorney, Agent, or Firm*—Spencer, Frank & Schneider

[57] ABSTRACT

An injection molding machine includes an injection unit defining a horizontal injection axis and a plasticizing cylinder centered and movable along the injection axis. The injection unit is movably mounted in a horizontal shifting direction transversely to the horizontal injection axis to a plurality of injecting positions, and selectively discharges plastic material out of the plasticizing cylinder along the horizontal injection axis on a plurality of parallel paths, into a central gating of a first injection mold and an offcenter gating of a second injection mold. A stationary mold carrier carries the injection molds, faces the injection unit and is provided with an enlarged opening in the shifting direction for receiving the plasticizing cylinder in each of the injecting positions. A drive unit moves the plasticizing cylinder along the injection axis into and out of engagement with one of the injection molds when mounted on the mold carrier, for injecting the synthetic material into the gatings. Guiding elements at the mold carrier guide ending sections of the drive unit which extend up to the stationary mold carrier and are guided in the shifting direction when displacing the injection unit. First and second rods are provided for the injection unit, the first rods extending in the injection direction connected to the injection molding unit, while the second rods are arranged transversely at the right angles to the horizontal injection axis and are disposed on a machine pedestal.

11 Claims, 10 Drawing Sheets

INJECTION MOLDING MACHINE FOR PROCESSING SYNTHETIC MATERIALS

BACKGROUND OF THE INVENTION

1. Field of the Invention

This invention relates to an injection molding machine comprising an injecting unit defining a horizontal injection axis and comprising a plasticizing cylinder centered on an movable along the injection axis. The injecting unit is mounted to be movable in a horizontal shifting direction transversely to the injection axis to a plurality of injecting positions and adapted in these injecting positions to selectively discharge plastic material out of the plasticizing cylinder along the injection axis on a plurality of parallel paths into central gatings of first injection molds and off-center gatings of further injection molds. In this way, a stationary mold carrier is provided with an enlarged opening in a shifting direction for receiving the plasticizing cylinder, which is moved by at least one drive unit along the injection axis into and out of engagement with any of the injection molds, when one of them is mounted on the mold carrier for the injection of synthetic material into the above mentioned gating. The stationary mold carrier is adapted to selectively carry the first and further injection molds. Guiding elements for ending sections of the drive unit extend up to the stationary mold carrier and are guided in the shifting direction when displacing the injection molding unit.

2. Description of the Prior Art

An injection molding machine of this kind is known from U.S. Pat. No. 5,007,816. This machine is adapted to selectively use further injection molds having off-center gatings in different injecting positions defining a central mold cavity. Under these conditions the plasticized synthetic material once injected reaches the mold cavity via a gate running approximately parallel with respect to the closing direction of the mold closing unit, which gate ends at the border of the mold cavity. A gate system of this kind in the following description is referred to as "parallel gating". In this machine the piston rods lying in a horizontal plane are movably guided. The injection molding unit is bedded on a carrier made of cast iron, which bears the injection molding unit and is shiftable on horizontal guidings to central and off-centered gatings. The shifting movement is realized by a shifting device operable by program, which comprises a distance measuring system as well as a spindle driving system. The shifting device is detachably fixed at the carrier. This arrangement allows a precise support and adjustment of the injection molding unit, whereby it is consciously accepted that costly supporting measures, in this case a shifting table, have to be provided. A further problem in this connection is that the feed screw is not easily accessible, especially for cleaning purposes, due to the preset arrangement of the injection molding unit parallely with respect to the injection axis. Because of the big distance between the shifting device and guiding elements, the danger of jams and inexact work is high.

Further, it is known from Swiss Patent 381,420 to arrange an injection molding unit transversely shiftable by a carrier on guiding elements fixedly connected to a machine base. The carrier itself abuts a further shifting device for horizontally moving the injection molding unit on further guidings to gates of injection molds. The guiding elements are angular guidings to enable an exact adjustment of the injection molding unit. Because of the loose connection between the mold carrier and injection molding unit, the injecting point of the nozzle differs from one injection cycle to the other and jams occur at the guiding elements for transversely moving the injection molding unit.

German Patent 40 34 577 discloses guiding piston rods of drive cylinders in a bushing support, which is passively carried along when the injection molding unit is shifted or also can be displaced manually. When the synthetic material is injected, a force in the piston rods opposed to the bearing pressure of the plasticizing cylinder has the effect that the bushing support is locked at punctiform guiding elements. Certainly it is a simple way to solve the connection of the bushings receiving the piston rods from the bushing support to the mold carrier, however, a field of force in the mold carrier results from the distance between the straining point of the piston rods and the force introducing points of the guiding elements, which makes necessary a lateral displacement of said guiding elements if shiftings of a large extent are to be realized. Consequently this facility is not adapted for an automatized shifting over the whole breadth of the mold carrier.

SUMMARY OF THE INVENTION

It is an object of the invention so to design an injection molding machine which is of the kind described first hereinbefore, that makes it possible to achieve a measuring exactness in an easy way at a reasonable price, which is especially necessary under high forces.

That object is accomplished in accordance with the invention in that when shifting first rods disposed into injection direction and bearing said injection molding unit slide freely on second rods transversely disposed with respect to said injection axis.

In such an arrangement the basic principle to let the carrier of the injection molding unit slide on transversely arranged rods meets the requirements for a rational mass production. The injection molding unit is supported only by rods sliding on top of each other. In so far no costly shifting mechanisms are necessary and the shifting facility is loaded with the frictional forces of the support being applied off-center. The surface friction drag can be reduced by plasma-nitriding the friction surfaces, whereby at the same time the requirements for a reliable protection against rust are met. On account of the flat materials used, a supporting accurate to dimensioning is made possible in an easy way, without the necessity of forming the machine base rigidly. The only expenditure that comes up is at the support points of the machine base, in order to guarantee a connection of the rods to the machine base in an adjustable manner.

Especially when bringing up high forces it is important, on one hand, to introduce the forces into the mold carrier securely and, on the other hand, to avoid jams in the region of the guidings of the injection molding unit on the machine base. Such jams will lead to damage and decrease the life time of the equipment. When, on the other hand, the carrier of the injection molding unit only slides on the machine base, such jams can not arise at all, because neither separate guidings for the back part of the injection molding unit, nor a drive for the transversal movement leading to jams, are provided.

According to a preferred feature, free ends of the ending sections of piston rods of the drive unit are received in bushings of at least one bushing support displaceable on the guiding elements. The bushing support comprises space for a horizontal movement of the plasticizing cylinder onto the gating. A spindle driving is provided as a shifting device for transversely shifting the bushing support together with the injection molding unit. In such an arrangement, the danger of jams is reduced by the lowered distance between shifting device and guiding elements where the shifting actually takes place. The displacement of the injection molding unit is only realized at the mold carrier. In the remaining section, the injection molding unit is bedded freely displaceable and slides on the machine base. In spite of the off-center engagement of the shifting device, the occuring forces can be managed securely, so that the high forces are consciously accepted for this kind of engagement. However, it should be considered that the nozzle center is exactly defined for every injection cycle without taking any special measures, since an independant adjustment of the injection molding unit during the locking motion is not impeded due to the fact that the shifting mechanism is placed far away from the cylinder head.

According to a preferred feature the guiding elements are guide rods and the end sections are constituted by piston rods of hydraulic drive cylinders of the drive unit and are arranged in a horizontal plane of symmetry of the mold carrier and are guided over almost the whole breadth of the mold carrier, at least in vicinity of the seats, by the guide rods fixed at the mold carrier. The seat support comprises a guiding groove on its top and its bottom, whereby the guide rod submerges into the guiding groove and the seat support movable with clearance is fixable at the guide rod by clamping elements and is arrestable in any of the injecting positions by clamping to the guide rods on that side of the guide rod that is turned away from the clamping elements. In such an arrangement the force introduction into the mold carrier is further improved on the one hand by the guide rod which guarantees that the force is transmitted regularly to the mold carrier and on the other hand by the guiding groove in which the guide rod runs, which secures a safe guiding. Since the force introduction is effected to a guiding element extending over almost the whole breadth, which force in the piston rods is opposed to the contact pressure of the plasticizing cylinder, a force identical connection in every position is granted. Consequently it is not necessary anymore to connect the injection molding unit at different points to the mold carrier. Instead the injection molding unit can be moved into any position desired.

According to a preferred feature the second rods are cross bars and are supported on finish-machined bearings at a machine base. The bearings are formed at a flanged longitudinal edge of side walls of the machine base, and a buttress block placed under the longitudinal edge is welded on from above by slots and abuts an adjusting screw centered 2 at the buttress block for the cross bars. Therein the first rods are a pair of rods constituting a slide together with two cross webs, whereby the slide bears supporting members on its front side for the drive unit. In such an arrangement the slide glides on rods, which are only supported at the lateral edges of the machine base, so that the space inside the machine base is always accessible for maintenance purposes. The coverings of the machine base placed under the rods can be removed independent whether the injection molding unit is mounted or not. In case the injection molding unit is mounted it can be shifted to the left respectively to the right side, thus permitting free access for the maintenance staff. Even if the machine base is not adjusted accurately on the spot, a precise regulation to dimensioning of the whole injection molding unit is possible by means of the adjusting device. However, basically a fixed connection of the cross bars with the machine base is sufficient, so that the cross bars are adjusted themselves together with the machine base when this is regulated. The slots make possible a simple manufacturing, since the buttresses necessary for realization of the adjustment can be fixed easily in the machine base from above. Although thus the injection molding unit glides on untreated surfaces of the machine when shifted, less friction is caused during this shifting process.

According to a preferred feature the supporting members are constituted by two identical casting bodies, disposed mirror symmetrically with respect to a vertical plane extending through the injection axis and mentioned supporting members being formed as radially splitted tensioning bushings in the area of the end sections of the drive unit, the tensioning bushes being clampable with the end sections by means of pulling bolts which intersperce gaps of the splitted tensioning bushings. Since in such an arrangement the supporting members, which link the drive unit with the slide, are constituted by two identical casting bodies being interconnected by cross bars, it is easier to manufacture these casting bodies, since no costly casting molds are required. Besides, each of the supporting members can be easily exchanged in case of disturbances. An additional advantage results from the shaping of the supporting members, which makes it possible to reduce the risk of blowhole formation in comparision to the known U-shaped shackles used so far.

According to a preferred feature the second rods are formed as cross bars and are interconnected by means of a supporting rod provided with a rest opening in which the injection molding unit is lockable. The support rod disposed in a plane of symmetry of the injection molding unit receives a rest element in mentioned rest opening of the injection molding unit when returned and wherein the injection molding unit is horizontally pivotable, whereby the piston rods of the drive cylinders, which are detached from the bushings after resting has been effected, are withdrawable. In such an arrangement the support in the rear section represents an improvement for maintenance works for example of the feed screw or the plasticizing cylinder. Before the piston rods are detached from the bushing support and after the injection molding unit is returned, it can be supported and secured at the machine base. The point at which the supporting is effected serves as swivelling point for slewing motions, which guarantee an easy access to the feed screw. In order to avoid that the remaining parts of the injection molding unit overturn, especially in case the feed screw and/or the plasticizing cylinder are dismantled, the injection molding unit is secured in this position by means of a lever.

According to a preferred feature the drive cylinder comprises an ring piston fixedly connected to the piston rods and constitutes one part with a radial flange being a piston of an injection cylinder of an injection unit. Furthermore, the drive cylinders and the injection cylinders constitute a common unit mounted in a bearing body by a cylinder cover and are made of iron. In such an arrangement the problems arising by the use of castings are avoidable. The praxis has shown that the use of castings under high pressures provides problems, because blowholes in the castings make nearly 25 percent of the castings unusable. Drive cylinders and injection cylinders are interconnected and can be inserted into the bearing body as common unit with low expenditure. To test this unit before mounting only the drive cylinder has to be closed by the cylinder cover. In case of trouble the complete unit may be exchanged in the firm of the customer even by unskilled persons, because again only the front cylinder cover must be removed to loosen the unit from the bearing body.

These and other objects and aspects of the invention are better understood with reference to the detailed description and accompanying drawings, and it will be understood that changes in the specific structure shown and described may be made within the scope of claims without departing from the spirit of the invention.

DETAILED DESCRIPTION OF THE PREFERRED EMBODIMENTS

Figure 1:
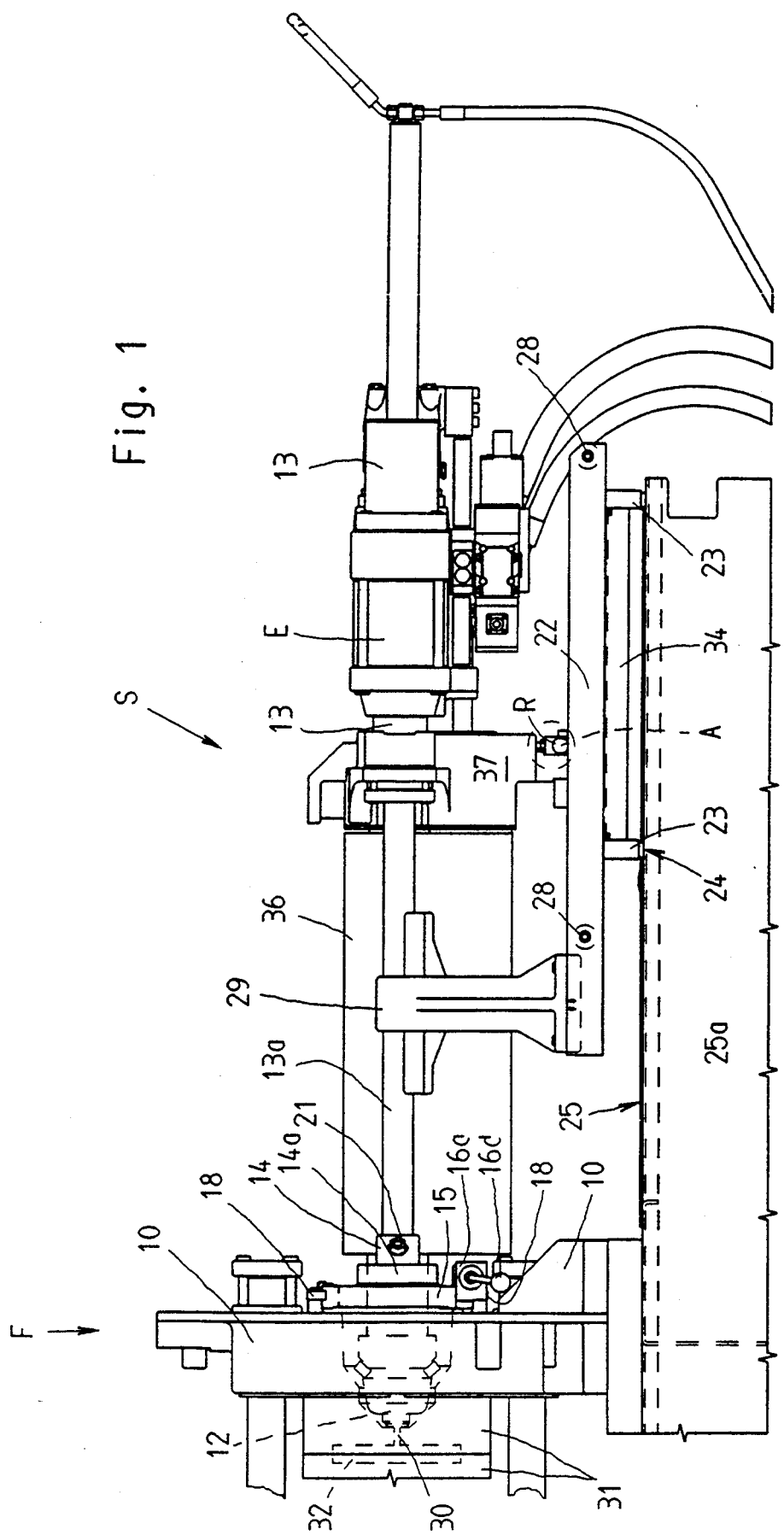
FIG. 1 is a side view of a part of the injection molding machine, which is limited to the mold carrier of the mold closing unit and the injection molding unit.

The invention will now be described in more detail by example with reference to the embodiments shown in the figures. It should be kept in mind that the following described embodiments are only presented by way of example and should not necessarily be construed as limiting the inventive concept to any particular physical configuration.

The stationary mold carrier 10 is part of the horizontally closing mold closing unit F of an injection molding machine for processing synthetic material, which is provided with a horizontally injecting injection molding unit S. The mold carrier 10 is adapted to carry first injection molds 31 (FIG. 4) having a central gating 30 defining a central mold cavity 32. Besides, different further injection molds 31' (FIG. 5) having an off-center gating 30' defining a central mold cavity 32' can be selectively carried by the mold carrier 10. An injection molding unit S, mounted to be movable in horizontal direction transversely with respect to its injection axis s—s by means of a shifting device, injects the plasticized synthetic material or any comparable material, as for example ceramic material, suitable for the production of machine injected mold parts. Thereby the injection is effected in a parallel gating manner after the injection molding has been parallely displaced, wherein the injection molding unit is movable onto the gatings on horizontel guiding surfaces of a carrier.

The free displaceability of the injection molding unit in the region turned away from the mold carrier is effected due to the fact that the injection molding unit when shifted slides on rods 23 transversely disposed with respect to the injection axis and abutting on parallel side walls 25a of the machine base by means of a pair of rods 22 which bear the injection molding unit and are disposed in injecting direction. Due to the cruciform arrangement of these rods, as is especially apparent from the top view according to FIG. 3, in the following they are designated as cross bars. Both cross bars 23 are supported on four finish-machined bearings at the machine base 25 and otherwise bridge the whole machine base (FIG. 4).

Figure 11:
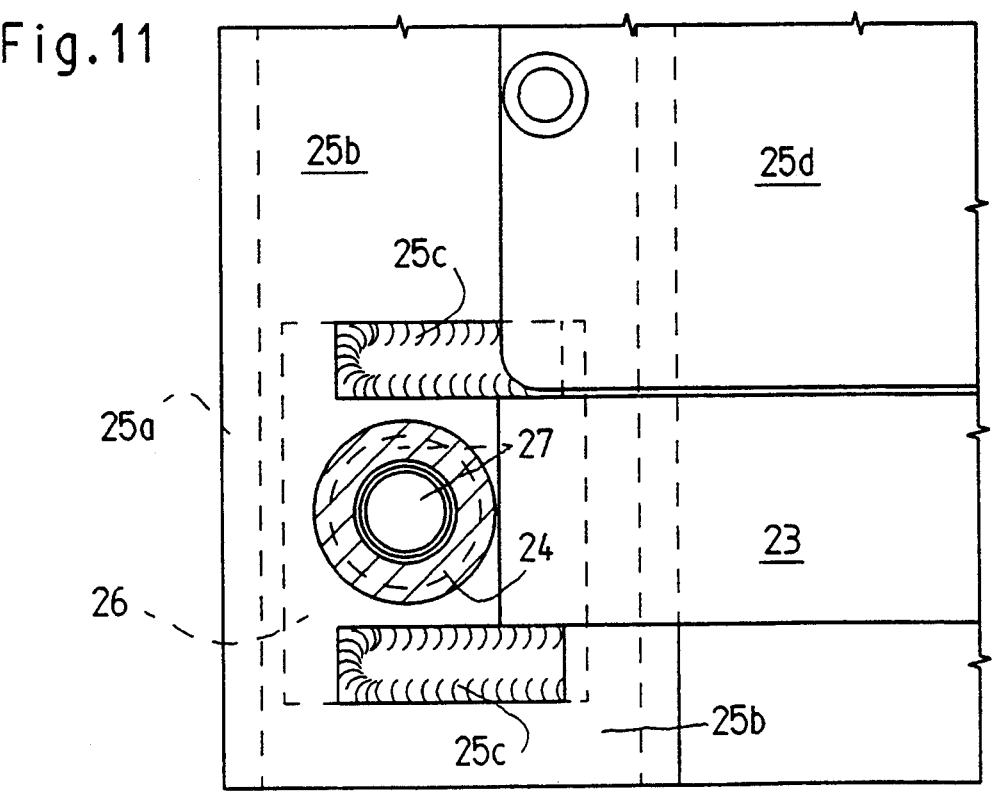
FIG. 11 is a top view of the bearing according to FIG. 10, partially cutted in accordance with line 11—11 of FIG. 10.

The mold carrier 10 has an enlarged opening 11 in shifting direction for receiving the plasticizing cylinder 12, which is disposed substantially symmetrical with respect to its horizontal plane of symmetry y—y (FIG. 11). The plasticizing cylinder can be put against the respectively mounted injection molds 31, 31' by means of hydraulic drive cylinders. However, it is also possible to use other kinds of drivings as for example electromechanical or pneumatical ones. The piston rods 13a of the drive cylinders 13 extend up to the mold carier 10 and constitute ending sections of the drive unit. When the injection molding unit S is displaced the free ends 13b are received in seats of at least one seat support shiftable on the guiding elements. Bushings 14 are used as seats. The seat carrier in the following is designated as bushing support 15. The bushing support 15 is provided with a recess 15a between its seats, which are formed as bushings for penetration of the plasticizing cylinder. The piston rods are indirectly guided by guiding elements of the mold carrier 10 via the bushing support 15. These guiding elements are placed outside the opening 11, for example above and below the opening. Thus the bushing support transmits the forces transmitted by the piston rods 13a during the injection process via the guiding elements to the mold carrier 10. The bushing support 15 overlaps approximately half of the opening 11, when it is in its two opposed extreme shifting positions. During the injection process the piston rods are axially fixed in their position at the bushing support 15.

The displacement of the bushing support 15 is effected by means of a shifting device, which in this concrete execution example is formed as spindle driving. Otherwise the injection molding unit is supported on the machine base and freely displaceable at least into the shifting direction. The spindle drive 16 can be actuated manually by means of a crank 16d in FIG. 4 or by an electrically or hydraulically driven motor. The spindle pivot bearing 16a is arranged at the mold carrier, whereas the nut 16b is associated to the bushing support. In order to prevent difficulties as for example dirt accumulations in the threaded spindle 16e, it is protected by a spindle sleeve 16c in the region between the two piston rods 13a.

Distance measuring devices are associated to the bushing support 15 and the mold carrier 10. The movable part of the distance measuring device is arranged at the bushing support 15 in vicinity of the guiding elements and its stationary part at the mold carrier 10 at the guiding elements. The machine can initially be delivered in a variant already prepared for later being supplemented with the shifting device. According to the corresponding requirements of the customer the machine can be either retrofitted or be supplied right from the beginning with the motor actuated spindle driving. In case a motive displacement is effected a linear potentiometer is provided as distance measuring device. Thereby the distance measuring system 17 emits signals to a control equipment indicating how far the injection molding unit has been already displaced. In case the injection molding unit is shifted manually a scaling 17c disposed at the bushing support and a pointer 17d placed at the guide rod 18 which is formed as guiding element is sufficient as distance measuring system 17.

In order to realize a shifting over the whole range desired, the guide rod 18 extends over almost the whole breadth of the mold carrier. The guide rod 18 is directly connected with the mold carrier 10 by means of studs. The piston rods 13a lying in a horizontal plane of symmetry y—y of the mold carrier 10 are guided by the guide rods 18 over almost the whole breadth of the mold carrier, but at least in the region of the bushings 14. Due to the plurality of studs 48 which secure the guide rods 18, the force introduction is almost identical in every position of the injection molding unit. The movable bushing support 15, which is shiftable with clearance, can be fixed at the guide rod 18 by at least one clamping element 19 (FIG. 11).

At the bushing support 15 the piston rods 13a formed as ending sections of the drive unit are held in the bushings by pulling bolts 21, which engage at the clamping surfaces 13c of the piston rods. The bushings are either directly formed at the bushing suport 15 or are fixed at the bushing support by bushing elements 14a. The bushing elements 14a are thereby connected with the bushing support by means of pulling bolts 47. Alternatively it is possible to mount different pairs of bushing elements with formed bushings on the flat grinded clamping surfaces 15c of the bushing support 15. The individual bushing elements 14a differ from each other by a different interdependant distance and/or a different inside diameter of their bushings. It is also possible to provide two bushing supports, each of them respectively receiving only one piston rod.

Figure 10:
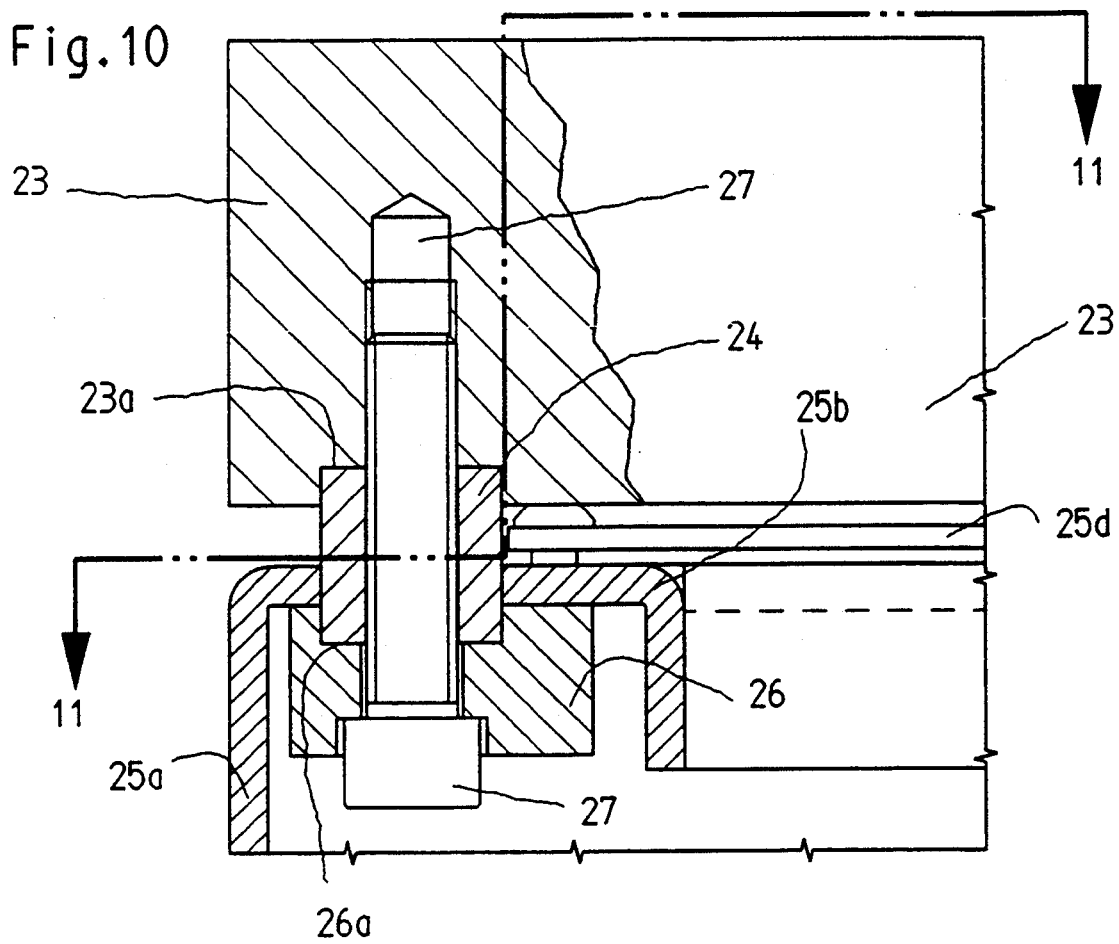
FIG. 10 is a side view in the region of a bearing point of the cross bars.

Basically the bearing 24 for the cross bars according to FIGS. 10 and 11 is located at the flanged longitudinal edge 25b of the side walls 25a of the machine base 25. Each bearing is provided with two slots 25c at mentioned longitudinal edge, which make it possible to weld a buttress block 26 on the machine base from above. This buttress block 26 serves as buttress for a centered screw 27. An opening is provided between the two slots 25c, which coaxially receives the screw 27 and a centering piece serving as bearing 24. The centering piece is bedded at the buttress block 26 as well as at the cross bars 23 in respective recesses 23a, 26a. Since the cross bars 23 can also be adjusted at this bearing points, in order to be independant from a precise mounting and the rigidity of the machine base, the screw 27 can also be an adjusting screw. In this case the screw 27 is accessible from below, however, it is also possible to provide the machine base with openings for putting ones hand through if required, so that it is easier to get to the screw. As an alternative the manufacturer is able to supply an execution in which the cross bars 23 are connected with the machine base in such a manner, that they are adjusted on the spot simultaneously with the machine base.

Figure 2:
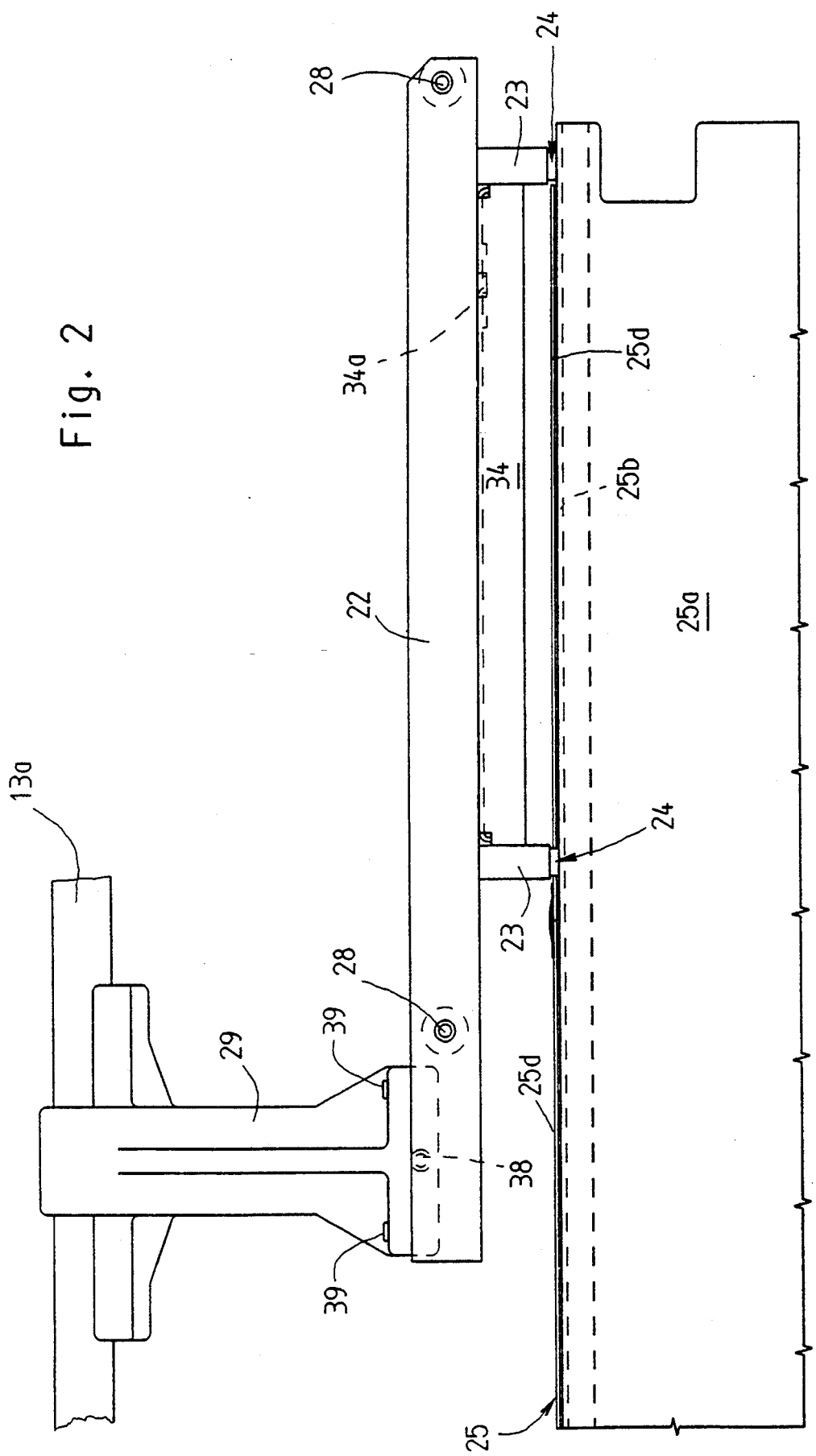
FIG. 2 shows an enlarged cutting of FIG. 1, which represents the bearing construction.
Figure 3:
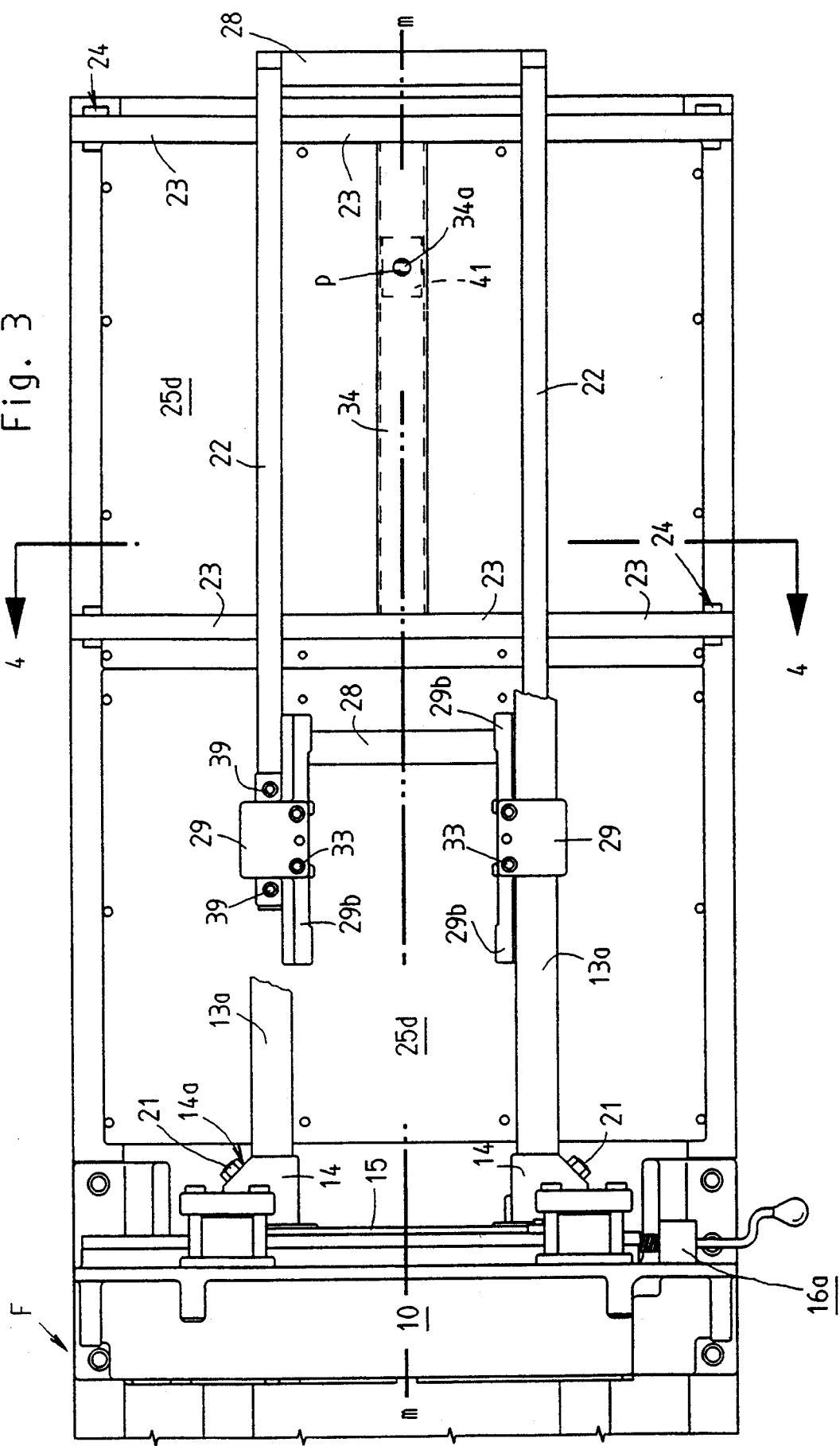
FIG. 3 is a top view of the injection molding machine according to FIG. 1, wherein the injection molding unit, except the piston rods has been removed.
Figure 4:
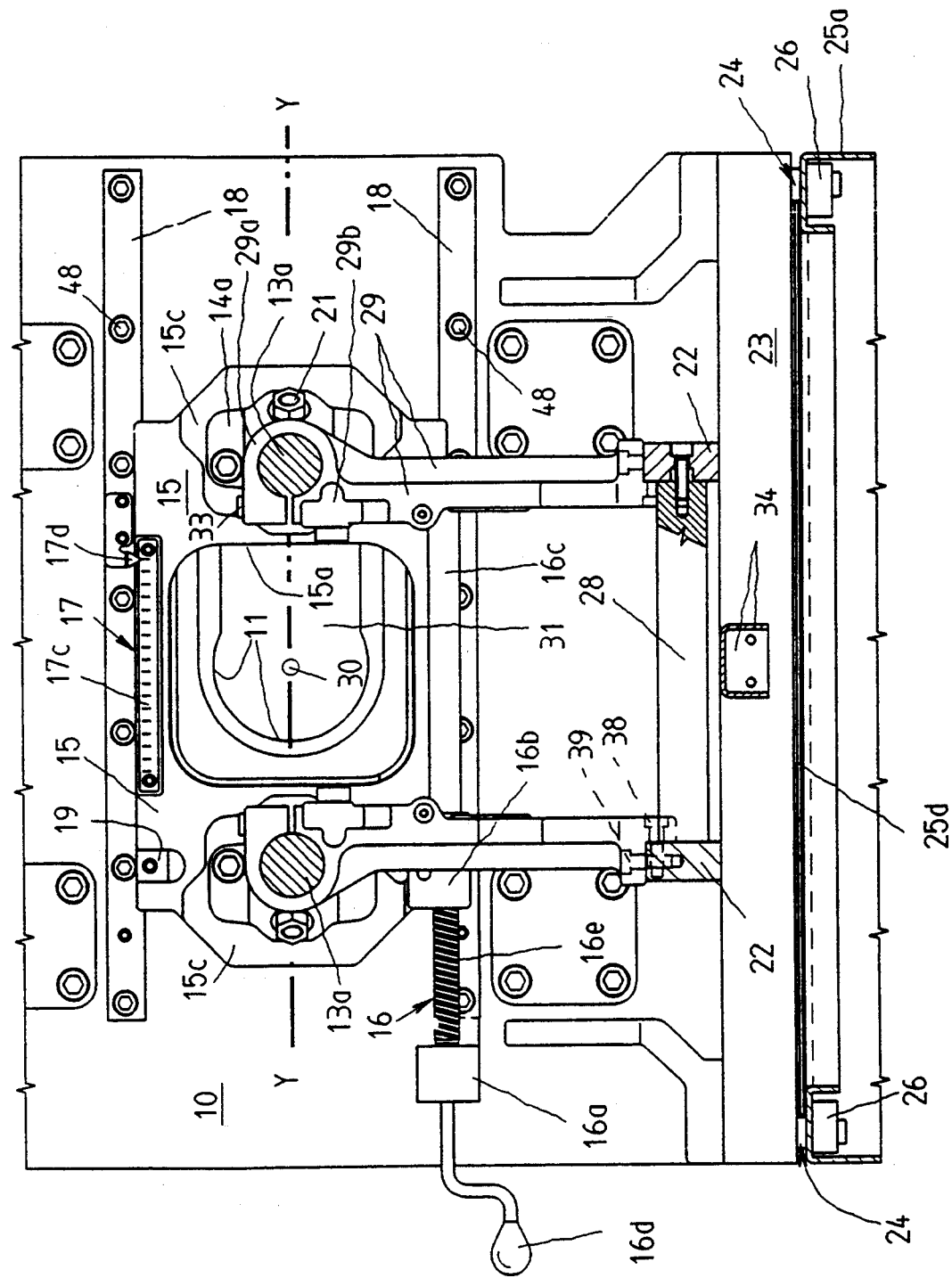
FIG. 4 is a sectional view of the mold carrier along line 4—4 of FIG. 3.
Figure 5:
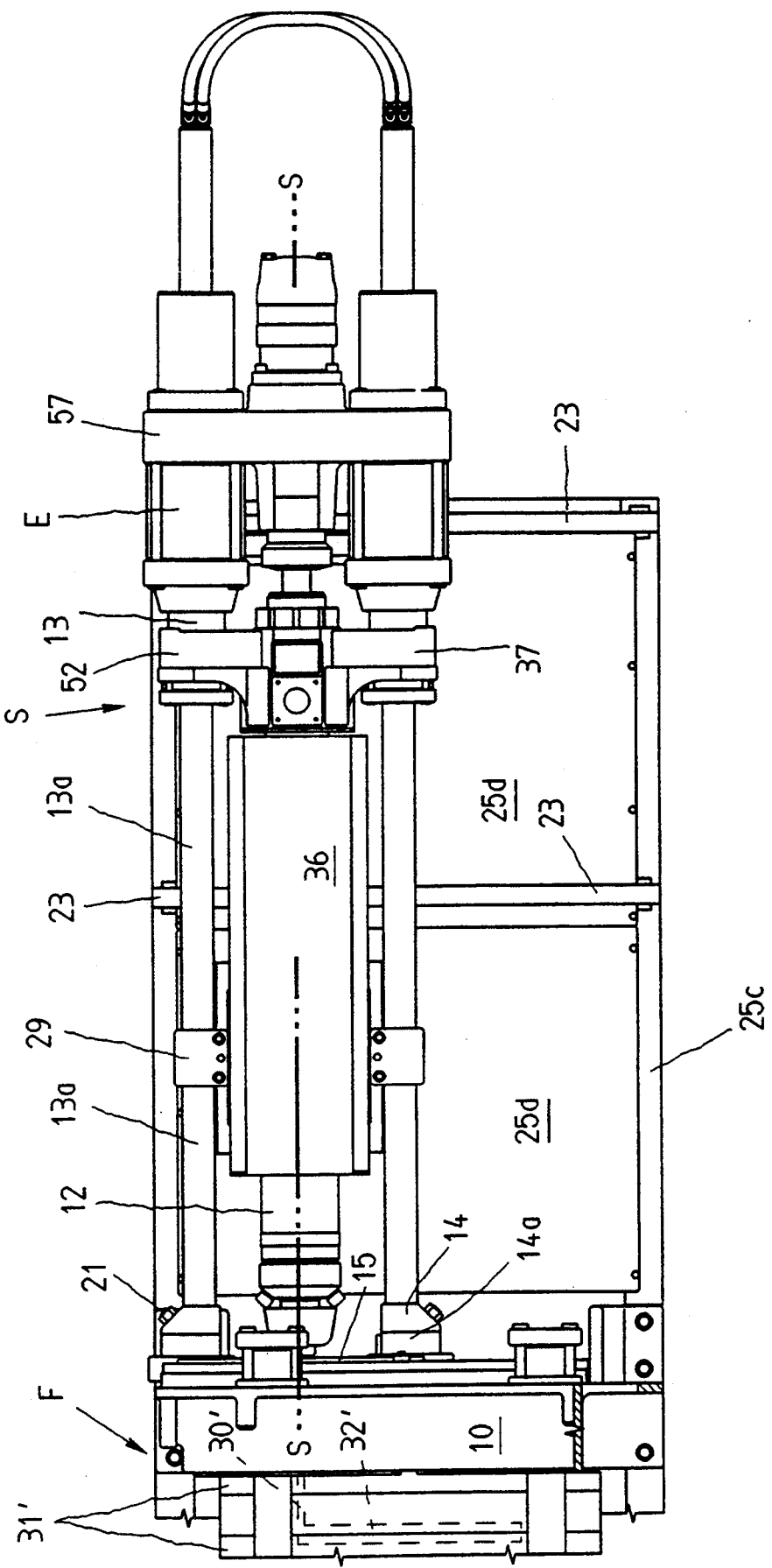
FIG. 5 is a top view of the injection molding machine according to FIG. 1 showing the injection molding unit in a lateraly shifted position.

As can be seen from FIGS. 2 and 3, the whole injection molding unit is beared by a pair of rods 22, which is connected so to constitute a slide by two cross bars 28. On its front side this slide bears supporting members 29 for the drive cylinders 13. In FIG. 4 the supporting members are connected with the pair of rods 22 via connected pins 38, 39. The supporting members are identical pieces, each of them being associated to each one piston rod 13a of the drive cylinders. In FIG. 5 the supporting members are arranged mirror symmetrically with respect to vertical plane running across the injection axis s—s. The pieces are casting bodies which are formed as radially cracked tensioning bushes 29a (FIG. 11) in the region of the piston rods 13a and are connected with a spanner 29b by means of pulling bolts 33 interspercing the joint for clamping of the piston rods 13a.

Figure 8:
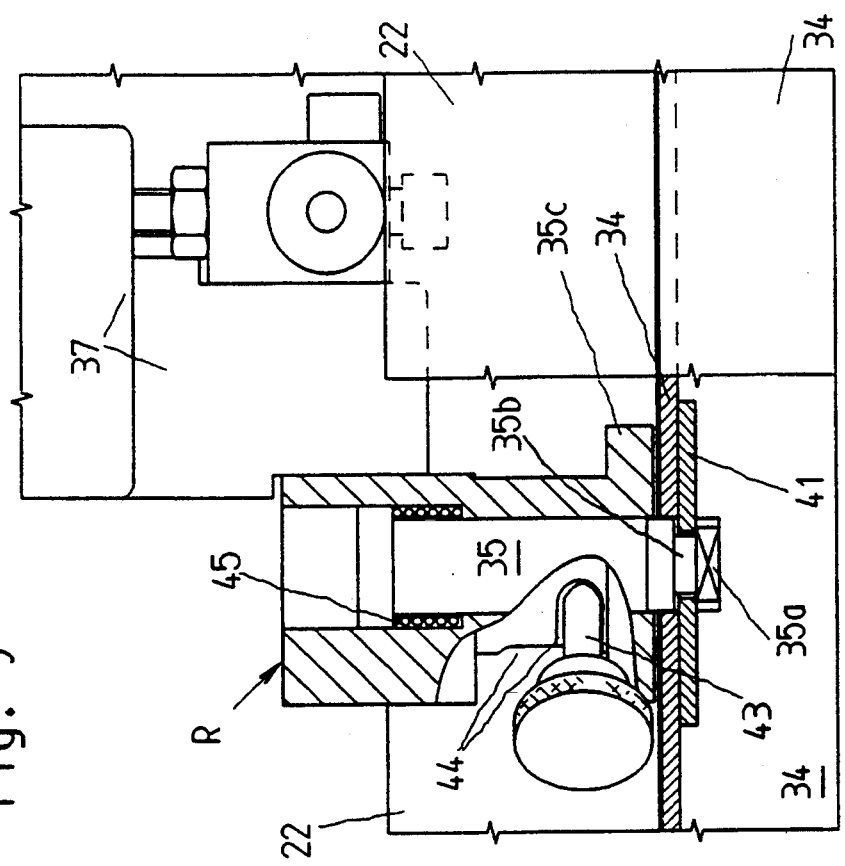
FIGS. 8, 9 show an enlarged cutting of section A of FIG. 1 in an unlocked respectively locked position of the stopping element for the swivelling process.

The cross bars 23 are interconnected by a supporting rod 34 being provided with a rest opening 34a in which the injection molding unit S can be locked by means of a stop mechanism R. This stop mechanism R is represented as an enlarged partial section A of FIG. 1 in the FIGS. 8 and 9. A counter plate 41, having a rectangular opening into which a rest element submerges, is arranged in the region of the rest opening. The rest element 35 is provided with a rectangular element 35a and a back handle 35b. The rest element 35 is adapted to be first vertically moved and then horizontally turned in a slot 44 against the force of a spring 45 by means of a lever 43. In the unlocked position according to FIG. 8 the lever 43 extends transversely as to the injection axis. When the lever 43 is moved vertically the cross-sectional form of the rectangular element 35a coincides with the rest opening 34a with regard to its cross-sectional form. During the turning movement taking place subssequently its final state shown in FIG. 9 the rectangular element 35a is turned and placed under the counterplate 41. This movement leads to a locking to the back handle 35b with the counterplate 41. The rest element 35 submerges into the rest opening above the back handle 35b until it is almost close to the counterplate 41. The stop mechanism R is supported by the bearing section 35c on the supporting rod 34. According to FIG. 8 the whole stop mechanism can be later fixed at the bearing body by bolts and be retrofitted by customer's request.

Figure 6:
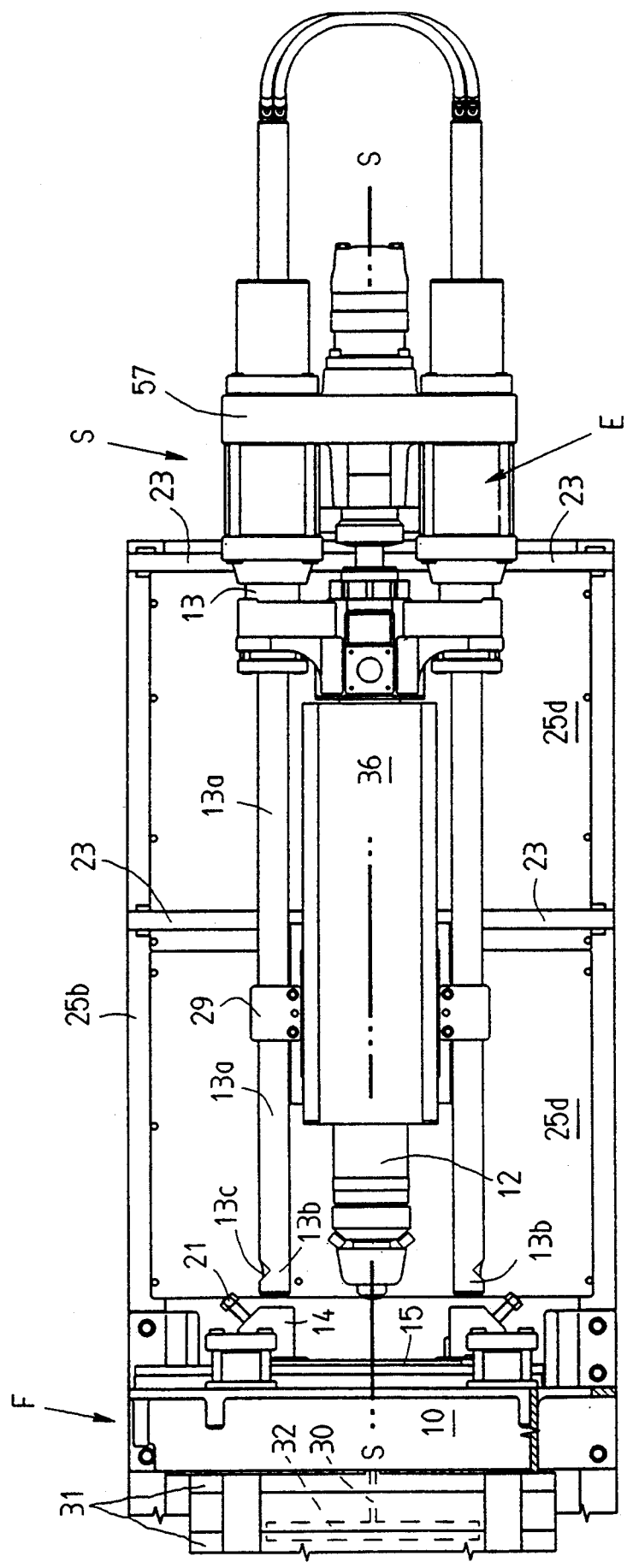
FIG. 6 is a representation according to FIG. 5, whereby the injection molding unit is shifted into its central position, the piston rods being already returned.
Figure 7:
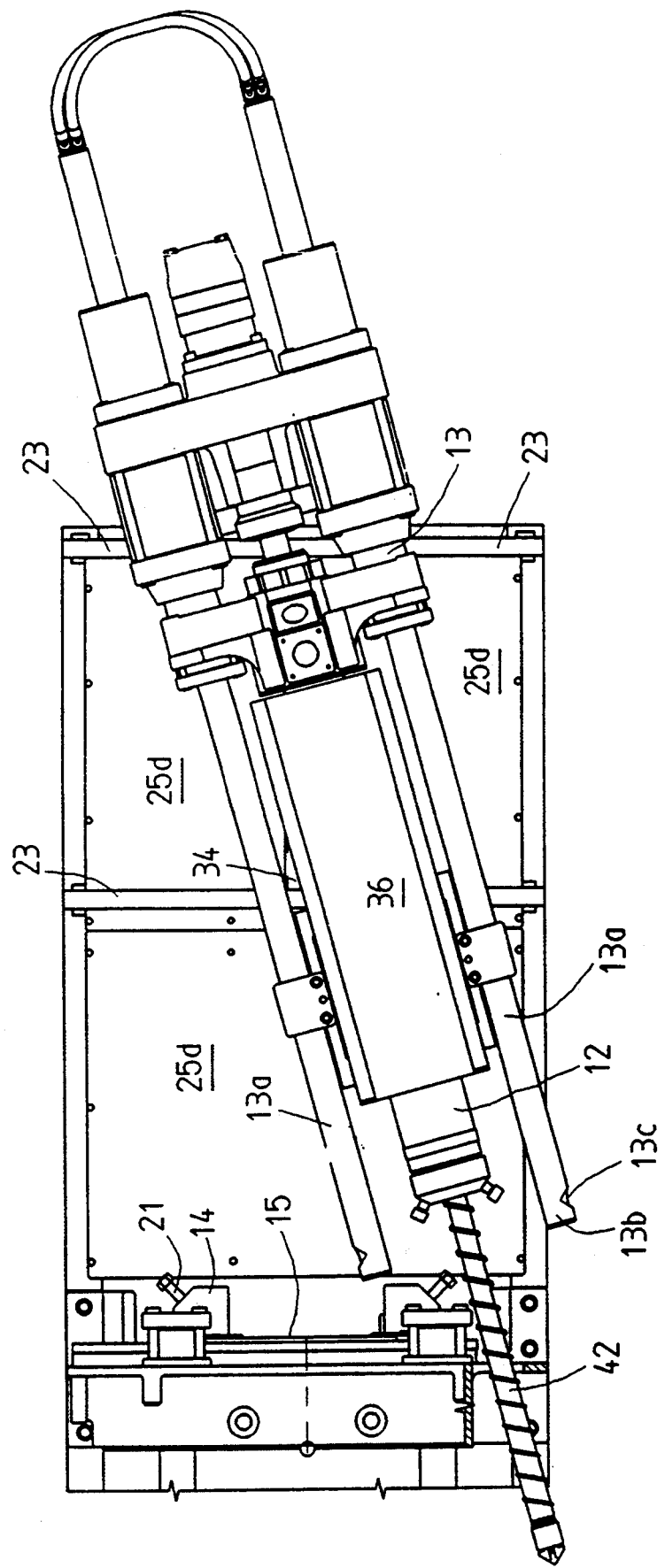
FIG. 7 is a representation according to FIG. 6, whereby the injection molding unit has been swivelled.

For locking the injection molding unit is returned to the "indexing" until the rectangular element 35a and the rest opening 34a overlap. After locking the piston rods 13a are loosened at the pulling bolts 21 from the bushing support. The piston rods are returned by the action which usually effects an advancing (FIG. 6). In the indexed position the injection molding unit can be safely swivelled on the cross bars 23 as represented in FIG. 7, in order to pull out the feed screw 42 from the plasticizing cylinder for cleaning purposes for example. When swivelled the center of gravity being in the region of the bearing body 37 lies approximately over the swivelling point P preset by the stop mechanism R. However, due to the arrangement of the supporting rod 34, the rest opening 34a on its part lies also approximately in the center of the plane of symmetry m—m of the injection molding machine.

Figure 9:
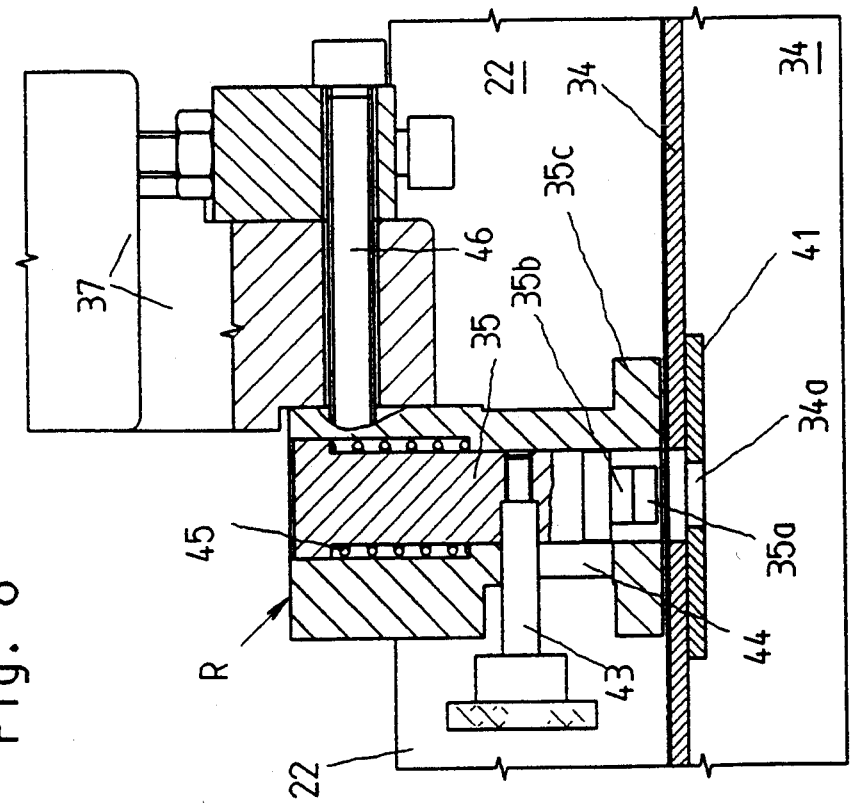

In spite of everything the inner chambers of the machine base 25 are accessible at any time by the covering plates 25d, as is apparent from the FIGS. 2, 9 and 11, since the covering plates 25d can be pulled out under the cross bars if required. Depending on which side of the injection molding machine the maintenance in the interior of the machine base has to be realized, the injection molding unit can be shifted accordingly, thus permitting free access without being impeded by the injection molding unit S.

Figure 12:
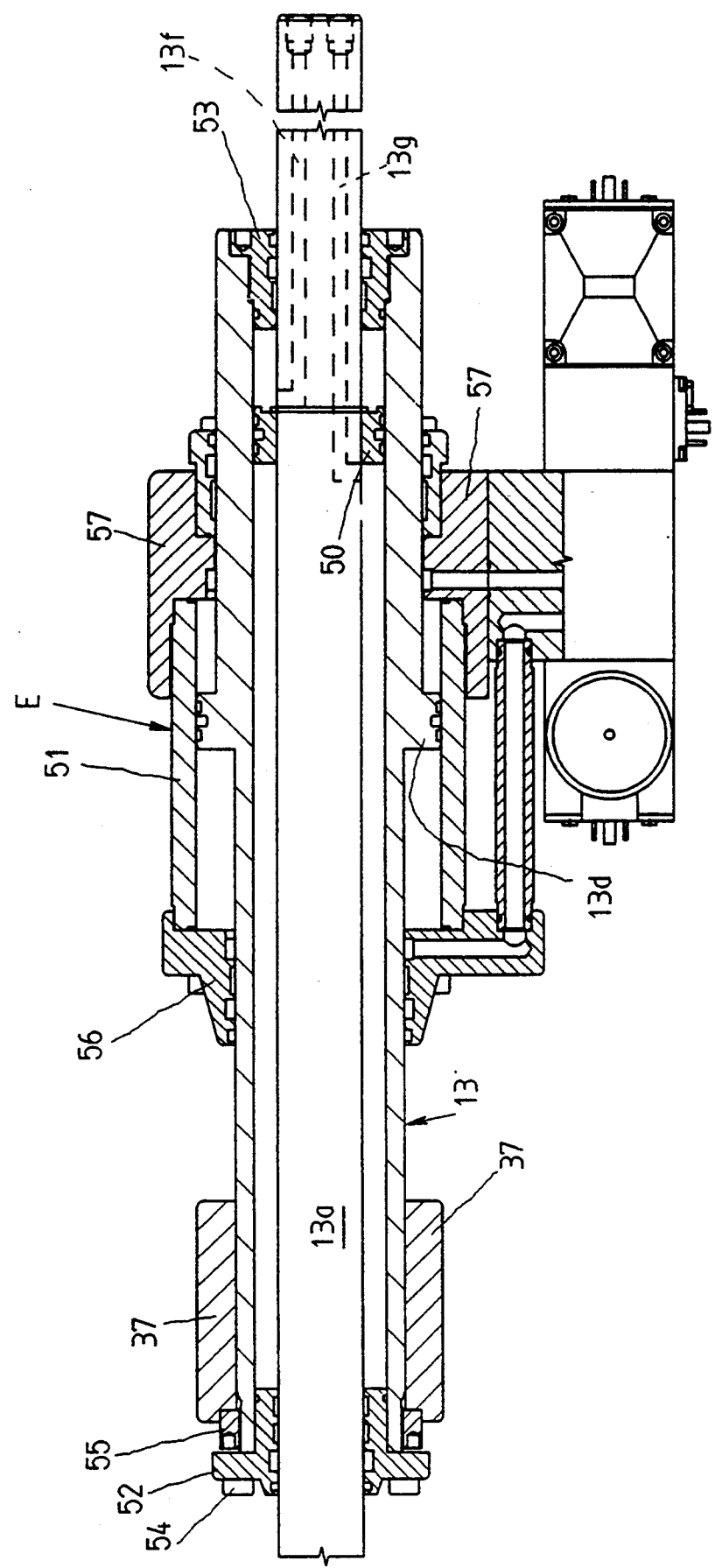
FIG. 12 is a vertical sectional view through drive and injection cylinders in the region of a piston rod.

Finally FIGS. 1 and 12 reveals the general design of the injection molding unit. The plasticizing cylinder is surrounded by a protective housing 36 and the injection cylinders E are placed coaxially to the drive cylinders 13. The drive cylinders 13 adapted for the axial movement of the injection molding unit are mounted on piston rods 13a serving as guiding rods. Ring pistons 50 of the drive cylinders 13 are fixedly connected to the guiding rods. Hence, each of the drive cylinders consists of one piston rod 13a with corresponding ring piston 50, one cylinder consisting of an iron hull and two cylinder coverings 52,53.

Two hydraulic injection cylinders E symmetrically arranged to the injection axis s—s are indirectly mounted on the bearing body 37. The injection cylinders are provided for the axial movement of a rotatable feed screw arranged in the plasticizing cylinder. The drive cylinder 13 bears the piston of cylinder 51 of the injection cylinder E simultaneously. The iron hull of the cylinder 51 of the injection cylinder E surrounds coaxially the iron hull of the drive cylinder 13. A radial flange 13d formed out of the iron hull of the cylinder 51 and insofar in unison with this cylinder is used as piston of the injection cylinder.

Drive cylinder 13 and injection cylinder E are mounted on the bearing body 37 as a common unit. The fixation is done by a cylinder cover 52 connected to the bearing body 37 via a few thread bolts 54 arranged approximately parallel to the injection axis s—s on a circular line. These thread bolts extend over a adjusting nut 55, screwed on a thread of the front end 13e of drive cylinder 13 and used as support of the common unit at the bearing body.

Before and behind the ring piston 50 two axial bores are ending used as supply passages 13f, 13g of cylinder chambers of the drive cylinder 13. The cylinder chambers are bordered by the piston rod and the iron hull of the cylinder and in axial direction by the ring piston 50 and the cylinder covers 52,53.

The drive cylinder 13 is simultaneously used as piston rod of the injection cylinder. The radial flange 13d may be engaged from both sides. The cylinder chamber of the injection cylinder E are bordered, on one hand, by both iron hulls and, on the other hand, in axial direction by a cylinder cover 56 and the injection bridge 57.

The injection molding unit will be mounted together as follows. The drive cylinder 13 will be enclosed in cylinder 51 plus cylinder cover 56. All together then will be fixed at the injection bridge 57. The drive cylinder will be provided with the cylinder cover 53 on the other side, then the guiding rod with the thereon fixed ring piston will be inserted in the now existing unit. Simultaneously the penetration through the bearing body is done. On the front side the adjusting nut 55 is screwed on serving as support of the common unit at the bearing body 37. Now, the cylinder chamber will be closed by insertion of the cylinder cover 52 fixed to the bearing body by the thread bolts 54.

It will be understood that the above description of the present invention is susceptible to various modifications, changes and adaptations, and the same are intended to be comprehended within the meaning and range of equivalents of the appended claims.

I claim:
1. In an injection molding machine comprising:
   an injection molding unit defining a horizontal injection axis and including a plasticizing cylinder centered on and movable along said injection axis; wherein said injection molding unit is mounted and movable in a horizontal shifting direction transversely to said horizontal injection axis to a plurality of injecting positions; and wherein said injection molding unit is adapted in said injecting positions to selectively discharge plastic material out of said plasticizing cylinder along said horizontal injection axis on a plurality of parallel paths, into a central gating of a first injection mold and an off-center gating of a second injection mold;
   a stationary mold carrier facing said injection molding unit and being provided with an enlarged opening in said shifting direction for receiving said plasticizing cylinder in each of said injecting positions; wherein said stationary mold carrier is adapted to selectively carry said first and said second injection molds;
   at least one drive unit operable to move said plasticizing cylinder along said injection axis into and out of engagement with one of said first and second injection molds when one of said first and second injection molds is mounted on said mold carrier for the injection of said synthetic material into one of said gatings; and
   guiding elements for guiding end sections of piston rods of said drive unit; wherein said end sections extend up to said stationary mold carrier and are guided in said shifting direction when displacing said injection molding unit;
   the improvement wherein first rods and second rods are provided for said injection molding unit, wherein said first rods extend in said injection direction and are connected to said injection molding unit, wherein said second rods are arranged transversely at right angles to said horizontal injection axis and are disposed on a machine pedestal, and wherein said first rods slide freely on said second rods, whereby said injection molding unit is slidably supported during shifting allowing for a self-adjustment of a nozzle of the injection molding unit.

2. The injection molding machine set forth in claim 1, wherein:
   free ends of said end sections of said piston rods of said drive unit are received in bushings of at least one bushing support displaceable on said guiding elements,
   said bushing support comprises space for horizontal movement of said plasticizing cylinder onto said gating, and
   a spindle drive is provided as a shifting device for transversely shifting said bushing support together with said injection molding unit.

3. The injection molding machine set forth in claim 1, wherein:
   said guiding elements comprise guide rods, and said piston rods are located in hydraulic drive cylinders arranged in a horizontal plane of symmetry and guided over substantially the whole length of said mold carrier by said guide rods fixed at said mold carrier.

4. The injection molding machine set forth in claim 1, wherein:
said second rods comprise cross bars supported on finish-machined bearings at a machine base,
said bearings are formed at a flanged longitudinal edge of side walls of said machine base, and
a buttress block is welded under said longitudinal edge and abuts an adjusting screw centered at said buttress block.

5. The injection molding machine set forth in claim 1, wherein:
said first rods comprise a pair of rods, and
said first rods, together with two cross webs, form a slide, whereby said slide has supporting members on a front side for supporting said drive unit.

6. The injection molding machine set forth in claim 5, wherein:
said supporting members comprise two identical casting bodies, disposed mirror symmetrically with respect to a vertical plane extending through said injection axis,
said supporting members are formed as radially split tensioning bushings in the area of said end sections of said drive unit, and
said tensionig bushings are clampable with said end sections by way of pulling bolts which intersperse gaps of said split tensioning bushings.

7. The injection molding machine set forth in claim 1, wherein:
said second rods comprise cross bars interconnected by way of a supporting rod provided with a rest opening in which said injection molding unit is lockable.

8. The injection molding machine set forth in claim 7, wherein:
said supporting rod is disposed in a plane of symmetry of said injection molding unit and receives a spring forced rest element of said injection molding unit in said rest opening, and
said injection molding unit is horizontally pivotable when said piston rods of said drive cylinders, which are detached from said bushings after resting has been effected, are withdrawn.

9. The injection molding machine set forth in claim 3, wherein:
each drive cylinder comprises a ring piston fixedly connected to a corresponding piston rod and has a radial flange.

10. The injection molding machine set forth in claim 9, wherein:
said drive cylinders and said plasticizing cylinder together form a common unit mounted in a bearing body by a cylinder cover and are made of iron.

11. In an injection molding machine comprising:
an injection molding unit defining a horizontal injection axis and including a plasticizing cylinder centered on and movable along said injection axis; wherein said injection molding unit is mounted and movable in a horizontal shifting direction transversely to said horizontal injection axis to a plurality of injecting positions; and wherein said injection molding unit is adapted in said injecting positions to selectively discharge plastic material out of said plasticizing cylinder along said horizontal injection axis on a plurality of parallel paths, into a central gating of a first injection mold and an off-center gating of a second injection mold;
a stationary mold carrier facing said injection molding unit and being provided with an enlarged opening in said shifting direction for receiving said plasticizing cylinder in each of said injecting positions; wherein said stationary mold carrier is adapted to selectively carry said first and said second injection molds;
at least one drive unit operable to move said plasticizing cylinder along said injection axis into and out of engagement with one of said first and second injection molds when one of said first and second injection molds is mounted on said mold carrier for the injection of said synthetic material into one of said gatings; and
guiding elements for guiding end sections of said drive unit; wherein said end sections extend up to said stationary mold carrier and are guided in said shifting direction when displacing said injection molding unit;
the improvement wherein:
first rods and second rods are provided for said injection molding unit, wherein said first rods extend in said injection direction and are connected to said injection molding unit, wherein said second rods are arranged transversely at right angles to said horizontal injection axis and are disposed on a machine pedestal, and wherein said first rods slide freely on said second rods, whereby said injection molding unit is slidably supported during shifting allowing for a self-adjustment of a nozzle of the injection molding unit; and
said end sections of said drive unit are received on a supporting element displaceable on said guiding elements, a spindle drive being provided for transversely shifting said supporting element and said injection molding unit.

* * * * *